Aug. 13, 1968   R. G. MILLHISER ET AL   3,396,844
VORTICAL SEPARATOR
Filed May 20, 1964                          3 Sheets-Sheet 1
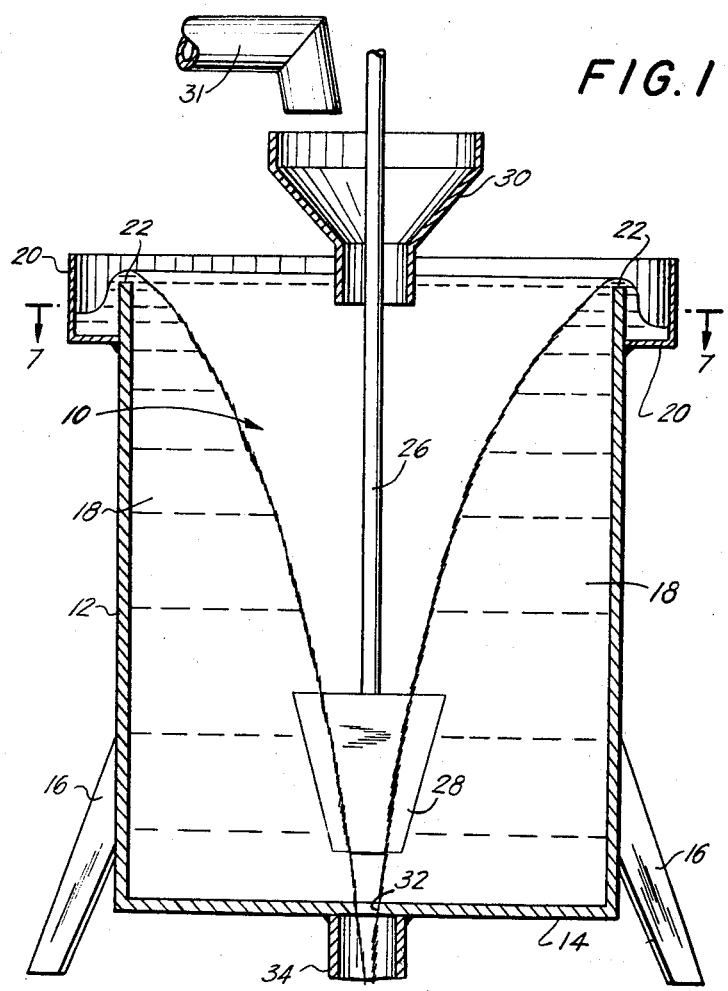
FIG. 1
FIG. 3
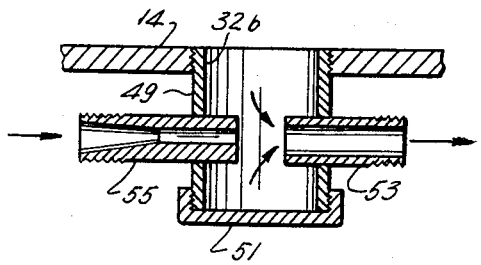
INVENTORS
ROBERT G. MILLHISER
WARREN W. WOOLL, JR.
BY
*Curtis, Morris & Safford*
ATTORNEYS

INVENTORS.
ROBERT G. MILLHISER
WARREN W. WOOLL, JR.
ATTORNEYS

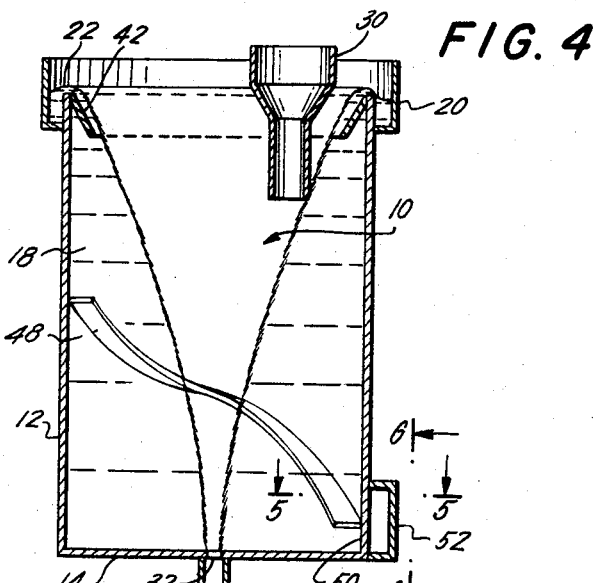
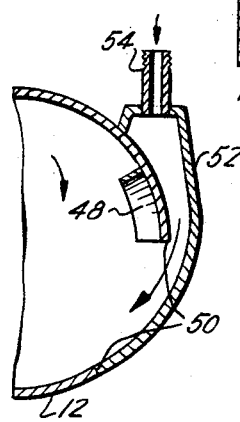
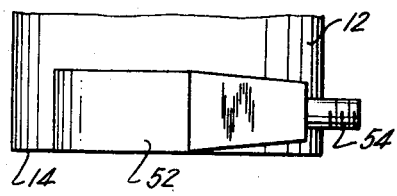

United States Patent Office 3,396,844
Patented Aug. 13, 1968

3,396,844
VORTICAL SEPARATOR
Robert G. Millhiser, Detroit, Mich., and Warren W. Wooll, Jr., San Diego, Calif., assignors to Ajem Laboratories, Inc., Livonia, Mich.
Filed May 20, 1964, Ser. No. 368,925
16 Claims. (Cl. 209—211)

This invention relates to the separation of solid particles, and more particularly, to a method of separating solid particles according to size and/or composition by means of a liquid vortex and to apparatus for such a method.

Solid particles of various substances and sizes are used in countless applications. In many of these uses, it is essential that the particles be of rather uniform size and/or composition. As examples may be cited the separation or classification according to size, of grit or metal shot, of material comminuted to varying degrees, and of mineral ore from gangue. Moreover, it is often necessary that such material be free of adherent fine particles of the same or of foreign composition. Illustratively, where very fine particles of the same or of foreign substances adhere to coarser particles or granules of the desired material, it is highly advantageous that the fines be removed prior to subsequent treatment or use of the material. For example, when such granules are to be treated in a liquid medium for whatever purpose, e.g., pickling, the fines should previously be removed in order to prevent them from becoming suspended in, or otherwise contaminating, the medium. Exemplary also is the situation when the desired particles are to be used in a wet-blast deburring operation or in barrel milling, to ensure maximum efficiency during such operations and to prevent clogging caused by fines.

It is an object of this invention to provide a method for separating particulate matter according to size. Another object is to provide a process for the separation of particulate matter according to composition. A further object is to provide a method for separating and removing solid particles without the use of a strainer. Still another object is to provide apparatus adapted to performing the method of the invention.

It has been found that particulate matter of varying sizes and/or composition can be effectively and efficiently separated by the kinetic action within a vortex of liquid. The material to be separated is continuously charged to the vortex, which can be generated in any suitable vessel, and likewise continuously charging a liquid thereto. Provision is made for liquid from the vortex to overflow from the containing vessel and also to flow out of the base of the vessel through an opening at the center of the vortex. Assuming the material is of uniform composition, the finer particles of material tend more readily to become suspended in the liquid and eventually are carried out of the vortex in the overflow. The larger particles (which are referred to here as "granules"), however, tend to move downwardly, as sediment, through the vortex and collect at the center where they are discharged through the bottom opening in the vessel.

This result is remarkable in view of the centrifugal forces acting on the larger particles, or granules, as they move in curved paths in the flowing liquid of the vortex, since those forces would be expected to cause all particles heavier than the liquid to move outwardly and to settle at the lower extremities of the vortex chamber. Nonetheless, the centrifugal forces are overcome and the larger particles are moved to the center of the maelstrom under the influence of a reverse or counterflow, a "secondary" flow, in the lower region of the vortex. That secondary flow within the swirling liquid begins near the confined outer reaches of the vortex where a portion of the liquid is driven downward and acquires a radial component of inward motion in the vicinity of the vortex base. Of course the radial motion, being merely a component of the swirling motion, is much less than the tangential component. But under usual conditions for treating the material, it is sufficient ultimately to impart enough inward force to the particles to overcome the centrifugal forces and thus move the particles through the base to the core of the vortex where a discharge orifice in the containing vessel is located in order to remove the accumulating larger particles.

Particles of a lesser magnitude of size will remain suspended in the vortex because their mass will not be sufficient to cause them to settle toward the bottom of the vortex. It should be appreciated that although the smaller particles in fact do have a tendency to settle, the rate at which they settle is much less than for the larger particles due to the difference in mass/area ratio. Thus, relative to the larger particles, the smaller ones practically can be considered to be suspended. In any event, because of the continuous addition and removal of liquid, the smaller particles are entrained in the flow and are removed in the overflow before they can settle to the bottom.

Particulate matter of differing composition can be separated in a similar manner if there is a reasonable difference in the densities of the compositions. Particles of lower density tend to become suspended and eventually are discharged as part of the liquid overflow in much the same way as the finer particles while the particles of denser matter settle and are discharged at the bottom outlet under the influence of the secondary flow in a fashion akin to the movement of the larger granules.

It should of course be appreciated that the particulate matter differing both in size and composition can be separated in the same fashion by taking advantage of the different effects the vortex has on the particles attributable to their size and to their composition.

This vortex method utilizes a combination of gravitational, centrifugal and flow entrapment effects, which can be adjusted relative to one another to take advantage of the particular differences between particles to be separated and others which are to be retained in the liquid. This can be done for example, by designing the equipment to give quiescent settling zones and/or multiple abrupt changes of direction, to give angular acceleration with rapid flow in a circular area of relatively short radius, and outlets from areas where entrainment in the flow carries smaller and/or lighter particles into the outlet, while inertial effects carry away the granules of greater mass/drag ratio. "Drag" here refers to the surface characteristic of the granule, including area irregularity or roughness and wettability, by which the liquid exerts a pull on the granules to carry them along therewith rather than merely to flow over them.

Furthermore, it should be understood that the method and apparatus of the invention used to separate particulate matter is likewise adaptable for classification of certain types of particles from other types when "classification" is used in the broad sense of a process of separating components, and especially included is the unique rotary filter described and claimed in applications Ser. No. 125,597, filed Mar. 9, 1961, now abandoned, and Ser. No. 199,717, filed June 4, 1962, now U.S. Patent No. 3,241,675.

When one recognizes that the separation process is a function of differences and coordination of the liquid and entrained particles, it follows that the liquid of the vortex can be of virtually any nature as found desirable for handling a specific type of material or materials. Water of course is the liquid most likely to be used.

Where differing densities of the materials to be separated are largely relied on to effect the separation, liquids having densities greater or lesser than the density of water may advantageously be used. In this regard, it will be appreciated that particles having densities closer to the density of the liquid will tend to be more readily suspended therein than particles having greater densities. Thus, the more nearly the density of the liquid approaches the density of the less dense suspended composition, the more efficient, in general, will be the separation of the different particles. Another reason for the increased efficiency in that situation is that the more dense material will be pulled through the vortex, by gravity or centrifugal force while the less dense matter will be held in suspension.

Various agents known to those skilled in the respective arts in which the invention is used can be added to the liquid for a variety of purposes, e.g., corrosion inhibitors, wetting agents and foam depressants. In addition, agents can be used for direct treatment of the material, e.g., acid cleansing of metallic material, passivating agents, rust inhibitors, etc. Thus, the invention can be adapted to carry out both separation and treatment operations simultaneously.

Vortices of two types can be considered for convenience. One type, which can be thought of as a "centrifuge vortex," is generated by mechanical energy. The simplest example of that type is where a rotating paddle or blade is used to swirl the liquid. The second type, which can be thought of as a "free vortex," is generated by the continuous entry of a flow of liquid into the containing vessel. For example, a flow of liquid under pressure discharged substantially tangentially into the vessel, due to its energy, will cause the liquid within the vessel to swirl and generate a vortex. Another method of generating the free vortex is to rotate the vessel containing the liquid so that the friction between the interior walls of the vessel and the liquid causes the liquid to whirl and form a vortex. Both centrifuge and free vortices can be used in combination with one another, or either can be used to supplement the other, in practical embodiments of the invention.

In order to illustrate the invention more clearly, reference will be made to the accompanying drawings wherein:

FIGURE 1 shows an axial section a centrifugal type vortex separator;

FIGURE 3 is a fragmentary view in axial section of an eductor type bottom discharge and grit transfer device;

FIGURE 4 shows in axial section a free vortex type separator;

FIGURE 5 is a fragmentary view in horizontal section showing the tangential liquid entrance for a separator taken along the line 5—5 of FIGURE 4;

FIGURE 6 is a partial elevation from the right of FIGURE 5 showing the tangential liquid entrance on the separator;

FIGURE 7 is a horizontal section showing a trough of a filter taken along the line 7—7 of FIGURE 1.

Figure 2:
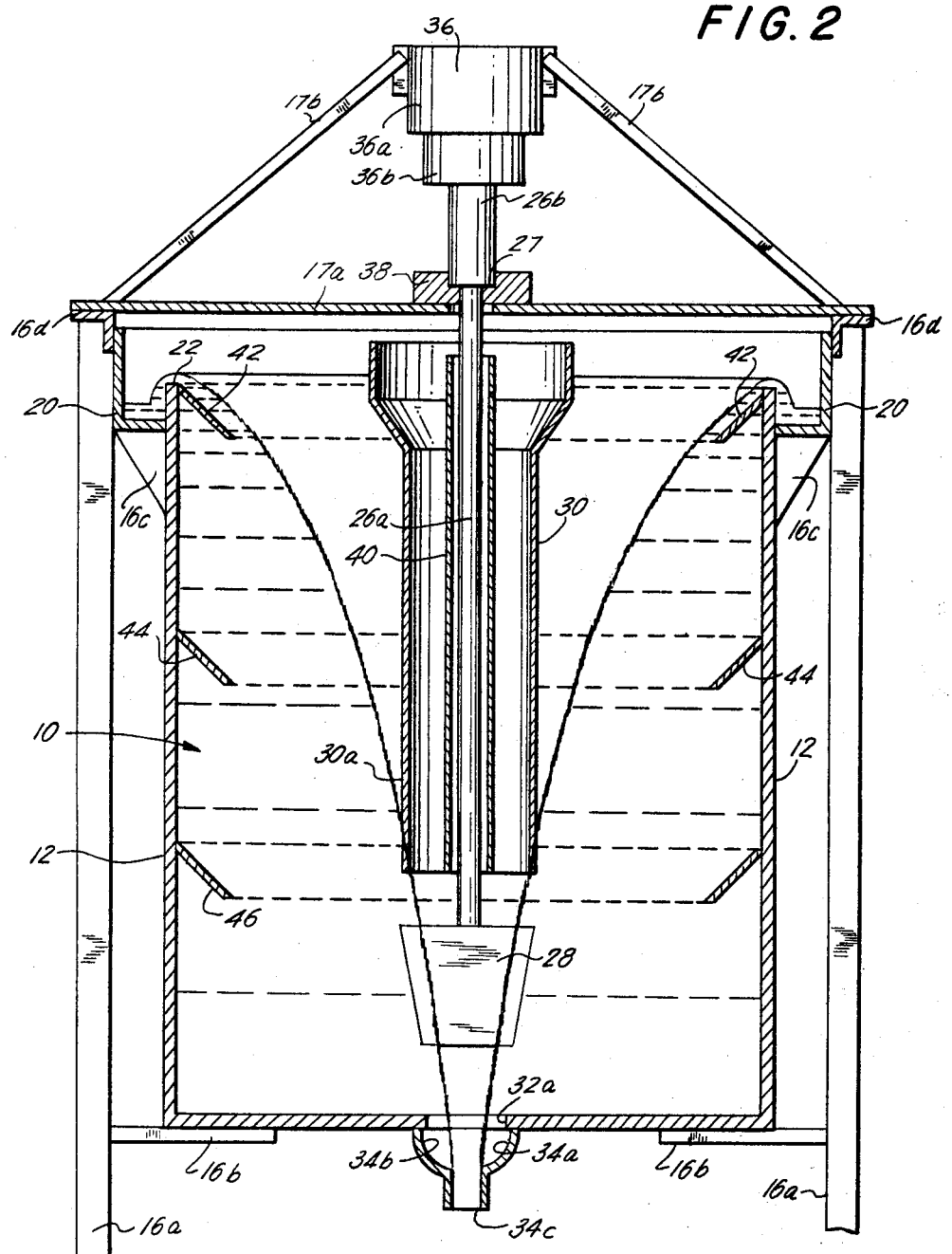
FIGURE 2 shows in axial section another centrifugal type vortex device.

Referring now to FIGURE 1, the separator 10 shown therein has a body of liquid 18, or vortex, within a drum 12. The base 14 is closed except for a central outlet 32 which will be further discussed below. Support members 16 are provided. Around the outer periphery of the upper end of the drum 12 is a trough 20 that serves to conduct away from the vortex 18 liquid overflow from the drum, the top edge of which acts as a weir 22. The trough 20 and its delivery spout 23 are shown in FIGURE 7 with arrows 24 indicating the direction of flow of liquid.

Axially positioned in the drum 12 is a rotating shaft 26 extending from, and powered by, motor means, not shown. At the lower end of shaft 26 is a paddle 28. The shaft and paddle are rotated to generate the vortex of the liquid body 18. The energy of the vortex, which in part governs the efficiency of the separation of particulate matter, can be varied by adjusting the speed of rotation of the paddle.

The paddle 28 can be of various configurations and sizes. For example, it can be a flat plate, as shown in FIGURE 1, a cluster of blades or vanes projecting from the shaft 26, a horizontal disk or any other arrangement suitable for causing the liquid 18 to swirl around inside the drum. The elevation of the paddle 28 within the drum 12 can be varied although it is preferred to locate it toward the base 14. The truncated conic impeller shape shown in FIGURE 1 has been found to be desirable since the outer edges tend to be more uniformly immersed in the vortex under operating conditions. The height of the paddle 28 is preferably about equal to its upper width while the lower width is about one-fourth the upper width with a reasonable latitude of variation. It has been found that in drums having diameters roughly two-thirds their height, the impeller desirably should be about one-third as wide as the diameter of the drum.

Suspended above the drum 12 is a hopper 30 advantageously coaxial with the drum and the shaft 26. Particulate matter to be classified is charged to the separator through the hopper 30. A portion or all of the liquid 18 can also be charged through the hopper, for example, from a pipe 31. As shown in FIGURES 2 and 4, and as will be discussed herein below, the hopper need not be located axially of the drum and can extend to varying depths therein. It will be appreciated that a hopper is not essential to the successful use of the invention, but other means can be used to charge particulate material to the separator.

In the base 14 of the drum is an orifice outlet 32 which serves as the discharge port for the larger and/or denser particles of matter being separated. The orifice 32 is shown in the center of the base of the drum since that location coincides with the center or "eye" of the vortex.

The size of the orifice 32 can be varied; the considerations pertinent to determining its size include the size and rate of solid material which is to pass therethrough and the amount of liquid which can be discharged and flow out of the filter base. The rate of liquid flow through the orifice is not necessarily related to the rate of solids flow therethrough. An orifice opening diameter in the order of one-twentieth the drum diameter has been found to be suitable.

The collar 34 attached to the base 14 at the orifice 32 is provided to form a conduit connection for delivering exiting liquid and solids to another place, e.g., a screen filter, a sewer or another similar vortex separator in cases where a series of separations are employed.

It will of course be appreciated that the base 14 need not have a planar surface, but can have surfaces of other shapes, for example, conical or dished.

FIGURE 2 shows another centrifuge separator 10 similar to the one shown in FIGURE 1 but having a variety of modifications. The drum 12 is supported by a frame comprising the members 16a–d, including base member 16b and trough members 16c and 16d all attached to leg members 16a. In addition, the drive means 36 are held by support members 17a and 17b attached to the frame members 16a and 16d to provide a self-contained, virtually portable filter. It will of course be apparent that any suitable system of frame members can be devised to support the drum and the drive means.

The drive means 36 comprises a motor 36a and, advantageously, a variable speed reduction device 36b so that the rotational rate of the shaft 26a can be adjusted to specific operating conditions. The shaft 26a passes through a bearing means 38 mounted on support member 17a to maintain the alignment of the shaft 26 and to support the drive means 36. An enlarged portion 26b of the shaft 26, for example a sleeve, provides a bearing and wearing shoulder 27 journaled in the bearing means 38.

A trough 20 similar to the one previously described catches the liquid overflowing the weir 22 of the drum 14. The paddle 28 is also as has been described.

Another modification shown in FIGURE 2 is the elongated hopper 30 which is provided to charge solids to be separated, and optionally liquid, to the lower region of the separator near the paddle 28. This arrangement has been found to be advantageous and provides greater efficiency since the solids to be separated are introduced into the lower portion of the vortex where the great bulk of liquid is and where the secondary flow is substantial.

Because material, especially solids, in the hopper tends to cause wear of the shaft, and the shaft tends to cause the material in the funnel to swirl prior to discharge therefrom, a stationary sleeve 40 can be placed around the shaft 26a. The sleeve 40 tends to promote a more desirable flow of material through the elongated hopper stem 30a. The hopper 30 can be supported in any desired way, for example, from support member 17a by suitable brackets.

It has been found that the efficiency of separation can be improved by one or more truncated conical annular baffles 42, 44, 46 positioned within the drum 14. While the elevation, size and the number of such baffles can be varied, certain ranges of those variables have been found to be especially advantageous. For example, it is preferred to use a baffle 42 at the inner periphery of the weir 22. Such a baffle apparently acts as an additional weir, or as an extension of the weir 22, to control the flow of liquid from the vortex out of the separator. Another desirable location for a baffle 44 is approximately mid-way between the weir 22 and the paddle 28. A baffle 44 so located apparently provides control and stabilization of the vortex in its central region. Still another preferred position for a baffle 46 is in the area adjacent to the paddle, that is, at the same or a slightly higher elevation than the paddle. A baffle 46 appears to affect the secondary flow within the vortex, e.g., tending to intensify the secondary flow and thereby promote the downward and inward movement of the larger, denser solid particles.

The baffles 42, 44, 46 are shown attached at their outer peripheries to the drum 12, although they may be spaced inwardly from the drum and supported within the vortex by connecting means.

The surfaces of the baffles are at an angle to the drum in the order of 45° although that angle can be varied over a considerable range. Baffles having widths ranging from about one-tenth to about one-third the drum diameter have been found effective.

Another type of baffle that has been found to be effective, as shown in FIGURE 4, is a helical baffle 48. The helix should move downwardly in the direction of the vortex's rotation. A typical arrangement is to use two helical baffles 48 each having a pitch angle of about 45°, spanning about one-half the way around the drum and beginning adjacent the base 14 on the vertical line where the other ends. The surfaces of such baffles 48 may be normal or at an angle to the drum wall and, optionally, may have an additional strip of material along the inside periphery to provide another baffling surface.

Another modification shown in FIGURE 2 is the use of an enlarged discharge orifice 32a in the base 14 together with a discharge collar 34a having one opening 34b fitted to the discharge orifice 32a and a significantly smaller opening at the other, exit end 34c. This arrangement promotes the discharge of solids through the orifice 32 and the collar 34 because it enables particles to pass readily through the orifice 32a at high rates and thereby be essentially removed from the drum 12. The enlarged portion of the collar 34a serves in effect as a reservoir for the particles, accumulating them when discharged at high rates while the reduced lower opening 34c maintains a desired rate of flow of liquid out of the filter. As shown in FIGURE 2, a portion of the vortex extends into the enlarged portion of the collar 34a.

FIGURE 3 shows a hydraulic grit transfer device suitable for use at the discharge orifice 32 in place of the collar 34 of the base 14 of a separator embodying the invention. This device is especially advantageous to use when the solids and liquid discharged therefrom are to be transferred to other locations for subsequent use or treatment by other than gravity flow. The embodiment of the device shown consists of a collar 49 which can be screwed to the base 14 at the orifice 32b, or otherwise secured thereto, a closing member 51, e.g., a standard pipe cap, a transfer tube 53 through the collar 49 about midway from the ends thereof, and a fluid nozzle 55 through the collar 49 at about the same elevation, but diametrically opposed to the tube 53. When a fluid (gas or liquid) is passed into the nozzle 55 its velocity is increased due to the constriction. The fluid drives both solids and liquid discharged from the filter into the collar outward through the transfer tube as indicated by the arrows.

Referring now to FIGURE 4, the separator 10 shown therein is of the "free vortex" type, that is, the vortex 18 is generated by a stream of liquid entering the drum 12 rather than by mechanical means within the drum. The separator has a base 14 with a discharge orifice 32 and a discharge collar 34, a weir 22, a trough 20, a baffle 42 at the weir, a hopper 30, and suitable supporting means (not shown). The liquid for the vortex 18 enters the drum 12 tangentially through an inlet port 50 in the side of the drum 12 near the base 14 from an adapter chamber 52 located externally to the drum (see FIGURE 5). As liquid enters the body 18, it tends to move around the lower inner periphery of the drum and thus to generate the vortex to effect separation of the solids. A helical baffle 48 within the drum, previously described, promotes the separation.

The hopper 30 in this apparatus is located toward one side of the drum 12 and extends down into the vortex. Such an arrangement is alternative to the one shown in FIGURES 1 and 2.

FIGURES 5 and 6 show in greater detail the tangential liquid entry. In both those figures it will be noted that the liquid is supplied to the separator by piping 54 attached to an adapter chamber 52. The use of such an adapter chamber 52 has been found more desirable than directly integrating the piping 54 with the drum 12. It has been found as one advantage that the incoming liquid tends to assimilate into the vortex liquid more smoothly, thereby reducing turbulence in the region of their confluence and minimizing disturbance of the secondary flow within the vortex.

It will be appreciated that modifications of the adapter chamber 52 can be made by persons skilled in the art and that the location of the inlet 50 can be at a higher elevation than shown in FIGURE 4. Moreover, more than one inlet can be utilized. Another variation in the free vortex classifier device and method is to charge liquid to the vortex through the inlet 50 and also to charge additional liquid through the hopper along with the solids to be separted or at other places.

In order to determine optimum conditions for operation, tests were conducted wherein design and operating parameters were varied. Among those parameters were the speed of rotation of a paddle in the vortex, the size of the paddle and its location in the drum, the use of conical baffles and helical baffles, their sizes and locations, and the depth of the hopper discharge.

The tests related below are representative of a variety of experiments, and the results are set forth as an illustration of the technique used to design the separators for a particular type of material. Each test used a drum about 22 inches in diameter and about 34 inches in height. The drum initially contained a charge of liquid which was converted into a vortex by rotating the paddle. Thereafter, additional liquid was charged to the drum through the hopper to establish a liquid overflow rate of about 55 gallons per minute. The liquid discharge through the base of the drum was in the neighborhood of 10–15 gallons per minute. Three pounds per minute of fine aluminum chips, having a fairly uniform size distribution were also charged along with the liquid, and the amount of chips carried out in the overflow was measured. The optimum design was the one that minimized the amount of chips in the overflow since solid particles of substantially smaller size or material of substantially lesser density, which would become suspended in the vortex, are to be discharged in the overflow. In all cases, an axially located hopper having a discharge about 5 inches in diameter was used, the depth to which the spout extended below the weir being varied.

*Example 1*

Under those conditions, a paddle similar to the one shown in FIGURE 1 having an upper width of 8¾ inches, a lower width of 1¾ inches and a height of 9 inches was rotated at 312 r.p.m. The hopper spout extended a few inches into the drum. 28 gms. of chips per minute were recovered in the overflow.

*Example 2*

An annular conical baffle as shown at 42 in FIGURE 2 having a width of 3 inches was then attached at the periphery of the weir, and the solid content in the overflow was reduced thereby to 3 gms.

*Example 3*

A second baffle, e.g., like 44 in FIGURE 2, having an 8 inch width was placed about 13 inches below the weir. This caused the amount of chips in the overflow to increase to 6 gms. However, by lowering the hopper spout to a level 16¾ inches below the weir, the overflow solid loading was reduced to 3 gms.

*Example 4*

Substitution of two helical baffles each having an L-shaped cross-section of ¾ by ¾ inch and a pitch angle of 45 degrees in lieu of the 8 inch baffle resulted in 4 gms. of chips in the overflow.

*Example 5*

*Variation of the paddle size.*—By using a paddle having an upper width of 10¾ inches in the separator arranged as described in Example 3, 26 gms. of solids were caused to discharge in the overflow, a probable indication of excessive turbulence caused by such a wide paddle.

*Example 6*

Reducing the paddle to an upper width of 7¾ inches reduced the overflow solid content to 4 gms., a 33% greater amount of solids than when using the 8¾ inch wide paddle of Example 3.

*Example 7*

The effect of rotational speed of the paddle was also examined: Increasing the speed of the paddle in Example 6 from 312 to 395 r.p.m. caused 4 gms. of chips to overflow. However, when the speed was reduced to 345 r.p.m., the outlet solid loading was reduced 50% to 2 gms.

*Example 8*

By reducing the paddle height to 8½ inches and upper width to 7½ inches, and extending the hopper spout to a depth of 16¾ inches, the chip load in the overflow was reduced to 1.6 gms., a 20% further reduction.

*Example 9*

The addition of a third conical baffle 3 inches wide at a depth of 21 inches and reducing the 8 inch baffle to 4 inches in width and raising it from 13 to 10 inches below the weir caused 2.6 gms. of solids to overflow.

*Example 10*

When the hopper spout was lowered 7 inches to a depth of 23¾ inches, very close to the paddle, the chip loading in the overflow was reduced about 38% to 1.6 gms.

The following table, wherein all dimensions are given in inches unless otherwise specified, serves to summarize the above-described variations, and permits easy comparison of the variations:

TABLE

| Example | Drive Shaft, r.p.m. | Hopper Spout [1] Depth | Impeller [2] Height | Impeller [2] Upper Width | Baffles No. 1 Width | Baffles No. 1 Depth | Baffles No. 2 Width | Baffles No. 2 Depth | Baffles No. 3 Width | Baffles No. 3 Depth | Helical Width | Solids in Overflow (gms.) |
|---|---|---|---|---|---|---|---|---|---|---|---|---|
| 1 | 312 | 3 | 9 | 8¾ | | | | | | | | 28 |
| 2 | 312 | 3 | 9 | 8¾ | 3 | 0 | | | | | | 3 |
| 3 | 312 | 3 | 9 | 8¾ | 3 | 0 | 8 | 13 | | | | 6 |
|   | 312 | 16¾ | 9 | 8¾ | 3 | 0 | 8 | 13 | | | | 3 |
| 4 | 312 | 16¾ | 9 | 8¾ | 3 | 0 | | | | | 3 | 4 |
| 5 | 312 | 3 | 9 | 10¾ | 3 | 0 | 8 | 13 | | | | 26 |
| 6 | 312 | 3 | 9 | 7¾ | 3 | 0 | 8 | 13 | | | | 4 |
| 7 | 395 | 3 | 9 | 7¾ | 3 | 0 | 8 | 13 | | | | 4 |
|   | 345 | 3 | 9 | 7¾ | 3 | 0 | 8 | 13 | | | | 2 |
| 8 | 345 | 16¾ | 8½ | 7½ | 3 | 0 | 8 | 13 | | | | 1.6 |
| 9 | 345 | 16¾ | 8½ | 7½ | 3 | 0 | 4 | 10 | 3 | 21 | | 2.6 |
| 10 | 345 | 23¾ | 8½ | 7½ | 3 | 0 | 4 | 10 | 3 | 21 | | 1.6 |

[1] 5 inch diameter hopper spout.
[2] Lower width about 1¾ inches.
Depths are the distances below the weir.

Preferred embodiments of this invention and various modifications thereof have been shown and described in this application, but it is to be understood that the methods, apparatus and assemblies set forth are for illustration of the invention and are particular manifestations of the inventive concepts disclosed herein and defined in the appended claims. These are chosen for illustrative purposes so that others skilled in the art will fully understand the invention and be enabled to modify it and make changes as may be required to best adapt to the conditions and requirements of the particular use to which the invention is to be applied.

We claim:

1. Apparatus for the separation of particulate matter by means of a swirling liquid vortex in which relatively smaller or less dense separated particulate matter can be removed from adjacent the top outer peripheral regions of the vortex and relatively larger or more dense separated particulate matter can be removed from adjacent the bottom central core area of the vortex comprising a vessel having a generally cylindrical vertical side wall substantially straight along its entire length and a substantially flat base for containing the liquid vortex, the height of said side wall being about one and one-half times the width of said base, said side wall having along its upper edge a vertically aligned weir over which liquid from the vortex containing suspended relatively smaller or less dense separated particulate matter can overflow, baffle means adjacent said weir extending inwardly toward and downwardly into the vortex to control the flow of liquid containing particulate matter over said weir, an orifice in said base substantially in the central area thereof on the axis of the vortex through which liquid from the vortex containing relatively larger or more dense separated particulate matter can pass and be discharged from said separation apparatus, rotatable paddle means to generate said vortex having its axis of rotation substantially coincident with the axis of the vortex, drive means for rotating said paddle means, means for charging particulate matter to be separated to the vortex extending into the core of the vortex, and means for charging liquid to the vortex whereby the liquid volume thereof can be maintained substantially constant and the amount of liquid overflowing over said weir can be controlled.

2. Apparatus for the separation of particulate matter as defined in claim 1 further comprising an annular second baffle means to control and stabilize the vortex, said second baffle means being secured to said side wall and extending inwardly therefrom into the vortex at an altitude of about two-thirds the height of said side wall.

3. Apparatus for the separation of particulate matter as defined in claim 2 wherein said second baffle means extends inwardly and downwardly from said side wall into the vortex.

4. Apparatus for the separation of particulate matter as defined in claim 2 wherein said second baffle has a width of between about one-tenth and one-third the width of said base.

5. Apparatus for the separation of particulate matter as defined in claim 2, and further comprising an annular third baffle means to intensify secondary flow in the vortex, said third baffle means being secured to said side wall and extending inwardly therefrom at an altitude of about one-third of said height.

6. Apparatus for the separation of particulate matter as defined in claim 5 wherein said paddle means is located in the vortex at an altitude below said third baffle means.

7. Apparatus for the separation of particulate matter as defined in claim 1 wherein said means for charging particulate matter to be separated is a conduit extending down through the core of the vortex into the lower half thereof.

8. Apparatus for the separation of particulate matter as defined in claim 1 wherein said means for charging particulate matter to be separated is a conduit located along the axis of the vortex, said drive means includes a shaft extending through said conduit to said paddle means, and shield means within said conduit and spaced around said shaft.

9. Apparatus for the separation of particulate matter as defined in claim 1 further comprising a discharge collar on the outside of said base having an entrance opening substantially coincident with said base orifice and a substantially smaller outlet opening opposite said base.

10. Apparatus for the separation of particulate matter as defined in claim 9 wherein said discharge collar has a substantially hemispherical entrance portion and a tubular outlet portion extending therefrom.

11. Apparatus for the separation of particulate matter as defined in claim 1 further comprising container means outside and secured to said base, an opening in one side of said container means substantially coincident with said base orifice for receiving liquid and particulate matter discharged from said vortex, outlet means in another side of said container, and means for projecting a stream of a fluid from a side of said container opposite said outlet means into said outlet means for transferring separated particulate matter discharged from the vortex through said outlet.

12. Apparatus for the separation of particulate matter by means of a swirling liquid vortex in which relatively smaller or less dense separated particulate matter can be removed from adjacent the top outer peripheral regions of the vortex and relatively larger or more dense separated particulate matter can be removed from adjacent the bottom central core area of the vortex comprising a vessel having a generally cylindrical vertical side wall substantially straight along its entire length and a substantially flat base for containing the liquid vortex, the height of said side wall being about one and one-half times the width of said base, said side wall having along its upper edge a vertically aligned weir over which liquid from the vortex containing suspended relatively smaller or less dense separated particulate matter can overflow, baffle means adjacent said weir extending inwardly toward and downwardly into the vortex to control the flow of liquid containing particulate matter over said weir, an orifice in said base substantially in the central area thereof on the axis of the vortex through which liquid from the vortex containing relatively larger or more dense separated particulate matter can pass and be discharged from said separation apparatus, liquid injection means opening in said side wall adjacent said base adapted for injecting liquid into the vortex substantially tangentially to said side wall to generate the vortex and to regulate the amount of liquid overflowing over said weir and thereby to maintain substantially constant the liquid volume of the vortex, and means for charging particulate matter to be separated to the vortex extending into the core of said vortex.

13. Apparatus for the separation of particulate matter as defined in claim 12 further comprising a helical baffle means on said side wall extending inwardly into the vortex and disposed from an altitude at about half the height of said side wall to an altitude adjacent said base in the direction of swirl of the vortex.

14. Apparatus for the separation of particulate matter as defined in claim 13 wherein said helical baffle means comprises two baffles spaced on opposite sides of said side wall and sloped at an angle of about 45°.

15. Apparatus for the separation of particulate matter by means of a swirling liquid vortex in which relatively smaller or less dense separated particulate matter can be removed from adjacent the top outer peripheral regions of the vortex and relatively larger or more dense separated particulate matter can be removed from adjacent the bottom central core area of the vortex comprising a vessel having a generally cylindrical vertical side wall and a base for containing the liquid vortex, said side wall having a weir along its upper edge over which liquid from the vortex containing suspended relatively smaller or less dense separated particulate matter can overflow, baffle means adjacent said weir extending inwardly toward and downwardly into the vortex to control the flow of liquid containing particulate matter over said weir, an annular second baffle means to control and stabilize the vortex, said second baffle means being secured to said side wall and extending inwardly therefrom into the vortex at an altitude of about two-thirds the height of said side wall, an orifice in said base substantially in the central area thereof on the axis of the vortex through which liquid from the vortex containing relatively larger or more dense separated particulate matter can pass and be discharged from said separation apparatus, rotatable paddle means to generate said vortex having its axis of rotation substantially coincident with the axis of the vortex, drive means for rotating said paddle means, means for charging particulate matter to be separated to the vortex extending into the core of the vortex, and means for charging liquid to the vortex whereby the liquid volume thereof can be maintained substantially constant and the amount of liquid overflowing over said weir can be controlled.

16. Apparatus for the separation of particulate matter as defined in claim 15, and further comprising an annular third baffle means to intensify secondary flow in the vortex, said third baffle means being secured to said side wall and extending inwardly therefrom at an altitude of about one-third of said height.

References Cited

UNITED STATES PATENTS

| | | | |
|---|---|---|---|
| 1,301,544 | 4/1919 | Crombie | 210—512 |
| 2,222,930 | 11/1940 | Arnold | 209—211 X |
| 2,297,009 | 9/1942 | Mead | 209—169 X |
| 2,719,668 | 10/1955 | Bergner | 209—211 X |
| 2,783,887 | 3/1957 | Chisholm | 209—211 |
| 2,840,240 | 6/1958 | Snyder | 209—211 X |
| 3,024,909 | 3/1962 | Dahlstrom | 209—211 |
| 3,219,186 | 11/1965 | Polhemus | 209—211 X |
| 2,598,409 | 5/1952 | Meckenstock | 209—496 X |

FOREIGN PATENTS

| | | |
|---|---|---|
| 574,644 | 4/1924 | France. |

FRANK W. LUTTER, *Primary Examiner.*